Jan. 26, 1932.   F. C. MORRISON   1,842,420
METHOD OF AND APPARATUS FOR REPRODUCING SOUND WAVES AND LIGHT WAVES
Filed Aug. 3, 1928   3 Sheets-Sheet 1
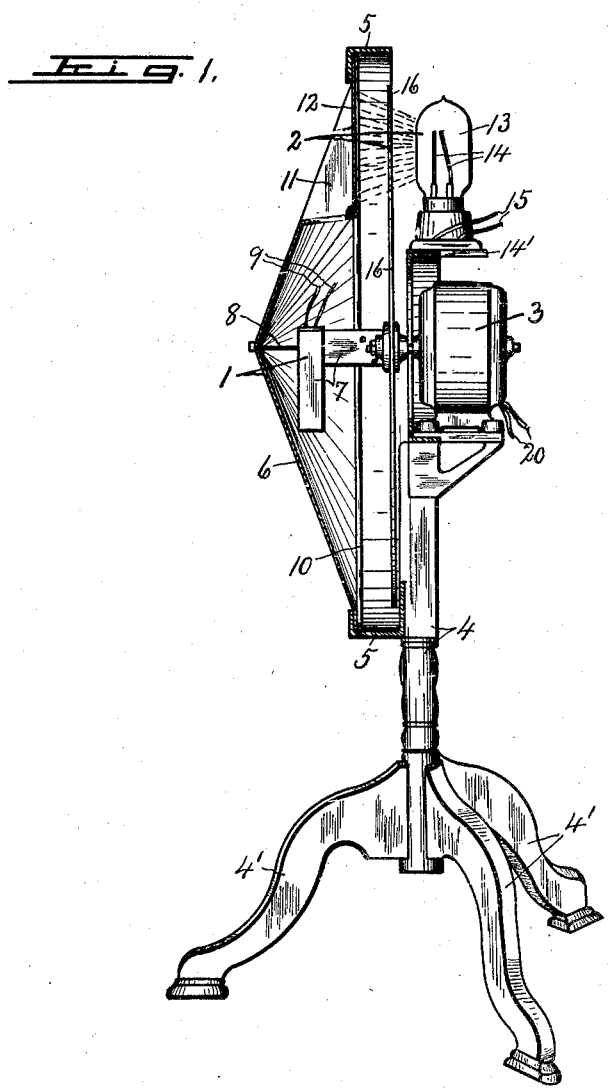

Jan. 26, 1932.   F. C. MORRISON   1,842,420
METHOD OF AND APPARATUS FOR REPRODUCING SOUND WAVES AND LIGHT WAVES
Filed Aug. 3, 1928   3 Sheets-Sheet 2
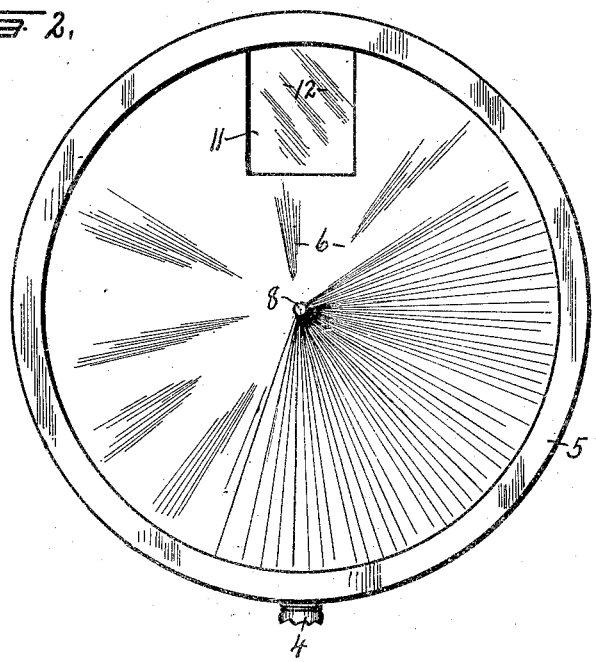
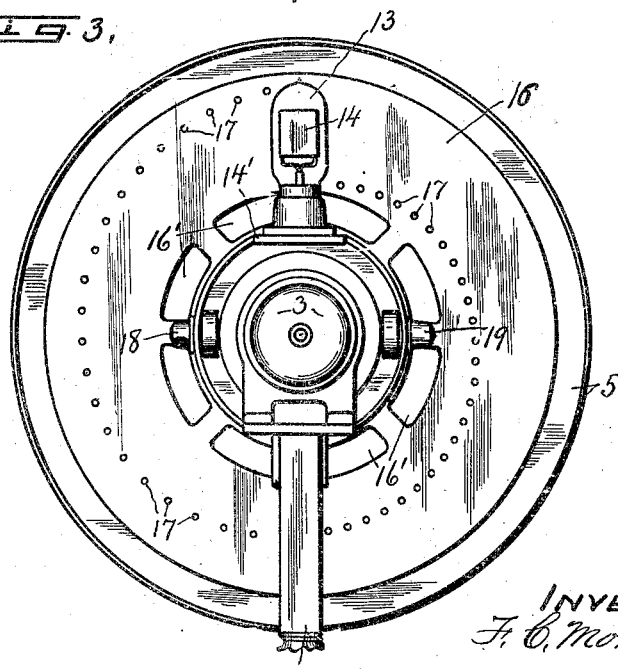

Jan. 26, 1932. F. C. MORRISON 1,842,420
METHOD OF AND APPARATUS FOR REPRODUCING SOUND WAVES AND LIGHT WAVES
Filed Aug. 3, 1928 3 Sheets-Sheet 3
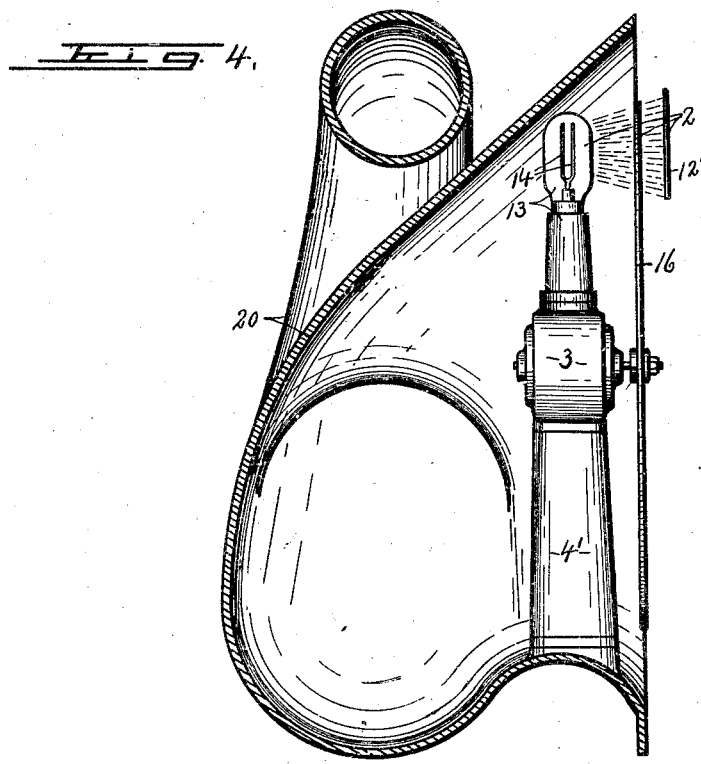
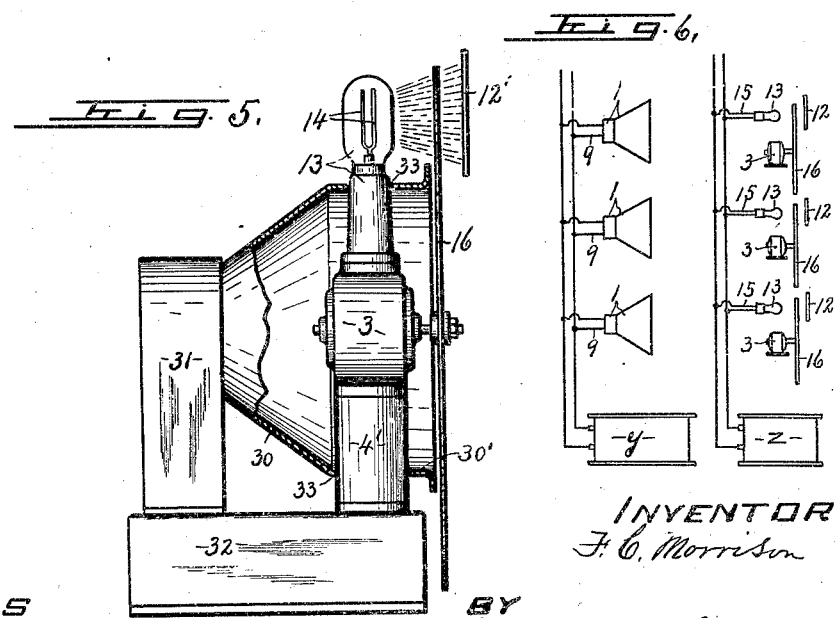

Patented Jan. 26, 1932

1,842,420

UNITED STATES PATENT OFFICE

FREDERICK C. MORRISON, OF SYRACUSE, NEW YORK

METHOD OF AND APPARATUS FOR REPRODUCING SOUND WAVES AND LIGHT WAVES

Application filed August 3, 1928. Serial No. 297,236.

This invention relates to a method of and apparatus for reproducing sound waves and light waves originating from the same or from different sources, such, for example, as radio sound transmitting stations and radio-television transmitting apparatus.

The main object is to provide a simple, compact and easily portable translating instrument as a unitary article of manufacture whereby sound waves and light waves transmitted from any remote or proximate source whether by radio, electrical or mechanical transmitting devices may be converted, translated and reproduced as audible sounds and visual pictures corresponding to the waves transmitted from both sources.

Another object is to permit the use of several reproducing instruments in proximate or more or less widely varying localities, all susceptible to operation from the same wave generating stations.

One of the specific objects is to utilize a part of the sound wave translating element as a light transmitting medium or picture screen through which motion pictures or still pictures may be projected by any suitable projecting machine for visual entertainment simultaneously with the transmission of sound waves.
Another object is to incorporate in the same instrument the sound wave translating means and the light wave translating means so that both sound and pictures may be presented to the individual or audience at one and the same side of the instrument.

Other objects and uses relating to specific parts of the apparatus will be brought out in the following description.

In the drawings:—
Figure 1 is a perspective view, partly in elevation and partly in section, of a sound wave and light wave translating instrument embodying the various features of my invention.
Figure 2 is a front face view of the upper portion of the instrument showing more particularly the sound wave translating element and the light wave transmitting section therein.
Figure 3 is a rear face view of the upper portion of the instrument as shown in Figure 1, the lower portion of the stand or pedestal being omitted.

Figure 4 is a sectional view, partly in elevation, of a modified form of my invention using a horn as a sound amplifier.

Figure 5 is a further modification of my invention showing another form of loud speaker.

Figure 6 is a diagrammatic view of a plurality of my combined sound and picture translators electrically connected to the radio sound impulse receiving and light wave impulse receiving instrument at a central station.

As illustrated this instrument comprises a sound wave translating unit —1— and a light wave translating unit —2— having one of its parts rotatable through the medium of a motor —3—, all of said parts being assembled and coordinated in suitable relation and mounted upon or within a common support such, for example, as a pedestal or standard —4— having supporting legs —4'— by which the entire apparatus may be supported upon the floor of a room in which the reproduced program is to be exhibited.

Under this construction the instrument is easily portable and conveniently moved from place to place by the user as may be desired for exhibition purposes in different locations and may be stored in relatively small space when not in use.

Sound wave translator

The sound wave reproducer or translating unit may be of any loud speaking or sound amplifying construction according to the nature of the impulses which it is adapted to translate into sound and is illustrated as a radio loud speaker of the cone type comprising a circular frame —5—, a vibratory conical diaphragm —6— and an electrically operated diaphragm actuator —7— operatively connected to the apex of the conical diaphragm —6— by a connecting rod or pin —8— whereby the energizing of the actuator —7— will transmit vibratory movement to the diaphragm —6— in a manner well-known in the art of radio loud speakers and not necessary to herein further illustrate or describe except that the electrical actuator —7— is connected by wires —9— to a radio-receiving set of any standard or practical construction.

The circular frame —5— is rigidly secured to the pedestal —4— and serves the double purpose of receiving and supporting the vibratory member —6— and its actuator and also to form a protective housing for the revolving element of the light-wave translating mechanism hereinafter described.

The marginal edge of the vibratory member or diaphragm —6— is secured within the marginal walls of the frame —5— by means of a split ring —10— or equivalent retaining means so that the apex of the diaphragm may project forwardly from the frame —5— which may also serve to increase the resonance of the sound amplifying unit. The interior diameter of the circular frame —5— is only slightly less than that of the diaphragm to allow the latter to vibrate practically throughout its entire area in response to the action of the actuator —7— which, in turn, is controlled by the impulses transmitted from the radio-receiving set —y—, Fig. 6.

Light wave translator

The light reproducing unit —2— may be of any suitable construction adapted to be used in connection with a radio television receiving set —z—, Fig. 6, or other picture projecting device whereby the impulses transmitted to, by or through said set or device may be converted into visual translations of said impulses at the front side of the sound impulse translator so that both the sound wave translations and light wave translations may be simultaneously discernible at one and the same side of the instrument.

As illustrated, a relatively small sector or segment of the diaphragm —6— is used as a part of the light wave translator and for this purpose is provided with an opening preferably above the axis thereof and in which is placed a transparent or translucent screen —12— corresponding approximately to the form and area of the opening —11— which is disposed in a plane at right angles to the axis of the conical diaphragm —6— to allow the rays of light from a suitable neon lamp to be projected therethrough.

A neon lamp —13— is mounted upon a portion of the frame or pedestal —4— at the rear of a diaphragm support —5— and also directly at the rear and in the horizontal plane of the screen —12—. The lamp —13— is supported in a plane some distance above the axis of the cone —6— but within the periphery thereof and is of sufficient size or capacity to project its instant rays of light with approximate uniform intensity throughout the major portion of the area of the screen —12—.

The lamp —13— is connected by suitable wires —15— to a radio television receiving set —z— or other electrical apparatus capable of intermittingly energizing the electrodes —14— at high frequency intervals whereby the rays of light projected from the lamp through the screen —12— will correspond in their scintillations with the frequency of projection of the impulses imparted by the television receiving instrument thus reproducing a visual translation of the pictures received by and transmitted from the radio television set.

In order to accomplish this last-named result an electric or other motor —3— is mounted upon the pedestal —4— with its armature shaft preferably coaxial with the axis of the sound wave translating cone —6—.

Upon this armature shaft is mounted a relatively thin rotary disk —16— of sufficient diameter or radius to extend radially across the major portion of the radial depth of the screen —12—, said disk being adapted to revolve in a plane between the screen —12— and lamp —13— in spaced relation to both of those elements but in sufficient proximity to avoid loss of intensity of the light rays from the lamp to the screen.

The disk —16— is provided with a circumferentially extending spiral row of apertures —17— arranged in relatively close but evenly spaced relation within the radial space corresponding approximately to the radial depth of the lamp —13— and screen —12—, said row of apertures beginning and ending at substantially the same radial line of the disk so that when the latter is rotated the rays of light from the lamps —13— will be successively projected through apertures —17— on to the screen —12—.

The speed of the motor —3— and disk —16— driven thereby is regulated so that the frequency of presentation of the apertures —17— in a direct line between the lamp —13— and screen —12— will correspond to the frequency of transmission of the impulses from the radio television receiving set whereby the light wave translations visually appearing on the screen will correspond to the impulses transmitted from the radio television set.

Any suitable controls may be used in connection with the sound wave translator and light wave translator for controlling the tone volume of the sound translator and speed of the motor driven disk and for this purpose is shown somewhat diagrammatically in Figure 3 a volume controlling switch —18— and a speed controlling switch —19—.

It is, of course, understood that suitable switches will be provided in the vibrator circuit —8—, lamp circuit —15— and motor circuit as —20— for controlling the operation of those parts.

These instruments as joint units may be installed in the different rooms of hotels, apartment houses, club houses and the like and operatively connected through the circuits —9— and —15— to the sound and light impulse receiving and transmitting set or sets at a central station which may be local or at a remote distance from the translating instruments, the electric motor —3— being electrically connected by the wires —20— to any suitable source of current supply, not shown.

The disk —16— and perforations —17— therein may be and preferably are similar to that used in the radio television broadcasting apparatus so that when driven by the motor —3— the apertures —17— may be successively presented to the screen —12— with the same frequency as that used in the radio broadcasting apparatus in order that the translated picture may be of substantially the same clearness as that produced by the broadcasting station.

For this latter purpose the speed of the motor and disk —16— may be adjusted or regulated by any speed regulating means, not shown, but well-known in the art of electric motor control.

The main requirement, however, is that the frequency of presentation of the apertures —17— to the screen —12— shall be substantially the same as that produced in and by the broadcasting apparatus and, therefore, any suitable disk or shutter which will accomplish this result may be used in connection with any operating means, it being understood that the frequency of energizing of the lamp —13— will be responsive in frequency to the impulses transmitted from the radio television set.

In Figure 4 the sound amplifier is made in the form of a horn —20— having its smaller end adapted to receive the sound wave impulses from a radio receiving set, preferably through the medium of any standardized vibrator and actuator therefor which may be similar to the actuator —7— shown in Figure 1, the larger end of the horn being flared outwardly.

In this construction the light wave translator may be mounted within or adjacent the larger end of the horn or upon a standard —4'— which is secured to and rises from the lower wall of the larger end of the horn for receiving and supporting the electric motor as —3—.

The neon lamp —13— is mounted upon the top of the motor case and together with the motor —3— and standard —4— are located a short distance within the rim of the horn.

The rotary shutter —16— is mounted upon the armature shaft of the motor to revolve in approximately the vertical plane of the rim of the horn and is similar in construction to that previously described and is provided with openings —16'— of suitable area to permit the passage of the sound waves from the diaphragm therethrough.

The screen —12'— may be supported in any desired manner in spaced relation to the outer end face of the shutter disk —16— to intercept the rays of light from the neon lamp —13— as they pass through the perforations in said shutter disk during the rotation of the latter, it being understood that the neon lamp will be electrically connected to the television receiving set of a central station in a manner similar to that previously described and that the motor may be driven from any source of current supply but preferably in synchronism with the shutter operating motor at the broadcasting station so that corresponding perforations of the shutter —16— will be presented to the screen —12'— simultaneously with the presentation of the corresponding perforations to the screen of the broadcasting station.

In the construction shown in Fig. 5 the sound amplifier preferably consists of a cone —30— mounted on a standard 31 which, in turn, may be secured to a resonant box base 32.

The larger end of the cone —30— is provided with an extension —30'— which is secured to the standard —4'— while the smaller end is connected to and vibrated by an actuator as —7— similar to that previously described.

In this latter construction the light wave pulsation reproducing translator is similar to that shown in Figure 1 except that the supporting standard —4'— and base of the neon lamp 13 extend through registering openings —33— in diametrically opposite sides of the extension —30'— while the motor —3— on the standard 4' is located approximately coaxial with said cone, the shutter disk —16— being adapted to revolve in a plane adjacent but in spaced relation to the outer end of the extension —30'— so that its apertured portion will extend beyond the periphery of the cone in front of the neon lamp —13—.

The screen —12'— may be supported in any desired manner in line with the lamp —13— and in spaced relation to the front face of the disk —16— so as to intercept the rays of light from the lamp as the apertures in the disk are successively registered with said rays during the rotation of the disk.

Otherwise the operation of these modifications shown in Figures 4 and 5 responds to the description of the operation previously given.

The neon lamp or its equivalent is specially constructed to accurately respond to each and all of the fluctuations of impulses of the electric translating medium of the television set over the circuit —15— in accord with the variations of light and shade of the field received by the broadcasting apparatus and transmitted therefrom to the television receiving set.

Under these conditions the number, size and relative positions of the perforations and speed of rotation of the shutter disk —16— will correspond to the number, size and relative positions of the perforations and speed of rotation of the shutter disk used at the broadcasting station for producing the pictures and transmitting them to the receiving set so that like perforations of both disks will synchronously produce and reproduce the same portions of the picture with the same intensity of light or shade.

*Operation*

Assuming that the receiving sets —y— and —z— are installed in some particular room or central station or a building and operatively attuned to reproduce the sounds and pictures transmitted from radio sound and picture broadcasting stations and that it is desired to continue the reproduction of such sounds and pictures from the receiving sets —y— and —z— to other remote rooms or localities, then a corresponding number of applicants reproducing or transmitting units would be installed in said additional rooms or localities and their respective vibrator actuators —7— and neon lamps —13— connected by their wire circuits —9— and —15— to their corresponding receiving sets —y— and —z— at the central station while the motor —3— of each translating unit would be connected by the wires —20— to any lamp socket in the rooms in which the instruments are located.

If the translating units have been properly installed and connected to the receiving sets —y— and —z— of the central station the switches in the circuits —9—, —15— and —20— of any one of the instruments may be closed to bring such instrument into action providing the receiving sets —y— and —z— are attuned for reception from the broadcasting station whereupon the sound and pictures transmitted to the receiving sets will be re-transmitted to one or more of the reproducing instruments in connection with the receiving sets, it being understood that each reproducing unit is equipped with means for governing the speed of the motor —3— and disk —16— to assure the synchronism of presentation of the apertures in the disk to the light rays of the neon lamp —3— simultanenously with the presentation of corresponding apertures to the photo-cells of the television broadcasting apparatus and that each aperture of the reproducing instrument will reproduce the same part of the picture as the corresponding aperture of the disk of the broadcasting station.

Under this system each user of one of the instruments forming the subject matter of this application may be entertained with the simultaneous reproduction of the same sounds and same pictures as they are produced in the broadcasting stations without the necessity of using separate sound receiving and television sets for each user thereby advancing the art of radio entertainment.

It is evident, however, that various changes may be made in the manner of combining the sound reproducing and light reproducing translators in one and the same unit without departing from the spirit of this invention.

What I claim is:

1. In an apparatus for simultaneously translating electrical variations into sound and light waves, an electrical sound reproducer including a flaring sound amplifier and an electrical light translator positioned within said sound amplifier and adjacent the mouth thereof.

2. In an apparatus for simultaneously translating electrical variations into sound and light waves, an electrical sound reproducer including a vibratory member having a translucent screen in a portion thereof, an electrical light translator positioned adjacent said vibratory member for projecting light rays upon said screen.

3. In an apparatus for simultaneously translating electrical variations into sound and light waves, a loud speaker having a conical vibrating element, a translucent screen mounted in the surface of said vibrating element, and an electrical light translating device positioned adjacent said screen for projecting light rays coresponding to electrical variations on said screen.

4. The combination of a sound-amplifier, an apertured shutter rotatable across the sound-exit side of the amplifier, a source of light at one end of the shutter arranged to project its rays of light through the apertures in the shutter, and a screen at the other end of the shutter arranged to receive said rays.

In witness whereof I have hereunto set my hand this 1st day of August, 1928.

FREDERICK C. MORRISON.